B. KUHNS & C. F. KNEISLY.
SPRING HOES FOR GRAIN DRILLS.

No. 184,246.                          Patented Nov. 14, 1876.

Attest:
Alfred Cloughly.
C. W. Connell.

Inventors:
Benjamin Kuhns
Christian F. Kneisly
Per Blanchard & Singleton.
Attys.

THE GRAPHIC CO. N.Y.

UNITED STATES PATENT OFFICE.

BENJAMIN KUHNS AND CHRISTIAN F. KNEISLY, OF DAYTON, OHIO.

IMPROVEMENT IN SPRING-HOES FOR GRAIN-DRILLS.

Specification forming part of Letters Patent No. 184,246, dated November 14, 1876; application filed March 22, 1876.

*To all whom it may concern:*

Be it known that we, BENJAMIN KUHNS and CHRISTIAN F. KNEISLY, of Dayton, in the county of Montgomery and State of Ohio, have invented certain new and useful Improvements in Spring-Hoes; and we do hereby declare that the following is a full, clear, and exact description thereof, which will enable others skilled in the art to which it pertains to make and use the same, reference being had to the accompanying drawings, and to the letters of reference marked thereon, which form a part of this specification, in which—

Figure 1:
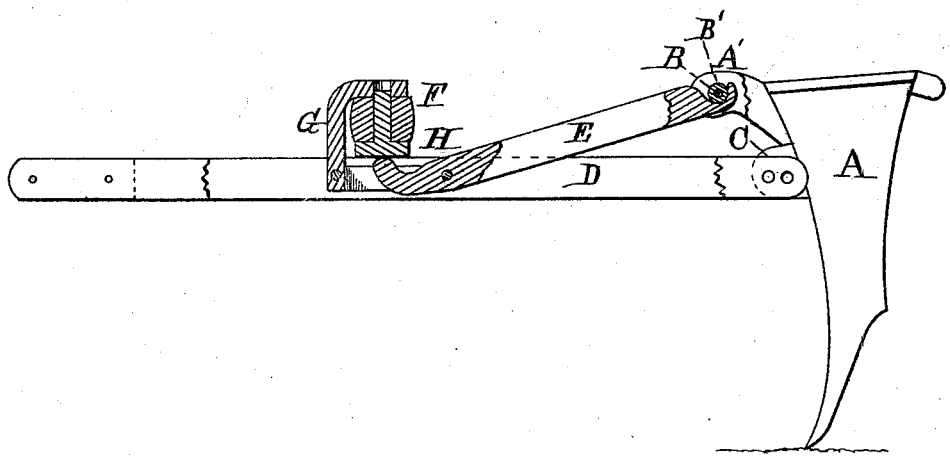
Figure 2:
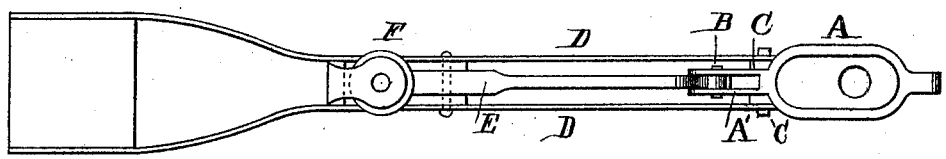

Figure 1 is a sectional elevation of a hoe or drill tooth and drag-bar, having our improvements attached thereto, the detachable latch, and the spring which holds it in position, being shown; and Fig. 2 is a plan view of the parts above enumerated, they being shown as in working position.

This invention relates to improvements in hoes or teeth for grain-drills; and it consists in providing such devices with a detachable latch, which is so constructed and arranged as to receive the force which is ordinarily required to keep the hoe in position in a direct line, and without transferring any considerable portion thereof to the spring, but which, when said hoe meets with any unusual obstruction, will be detached therefrom, and thus allow the hoe to pass over said obstruction, when, as a consequence of the action of the spring, it will be returned to its proper position, and the latch will retain it there until another obstruction is met with.

In constructing devices of this character we use a hoe, A, of usual or of any suitable form of construction, it being provided with a bifurcated projection, A', through which passes a pin, B, as shown in the drawing. This hoe is also provided with projecting ears C C, to which the drag-bars D D are secured, from which point they extend forward, and are connected to the frame of the machine.

For the purpose of holding the hoes or drill-teeth in the proper position for delivering the grain, we pivot to the drag-bars a latch, E, the rear end of which has formed in it a concave or rounded recess, as shown in Fig. 1, which, when the hoe is in the proper position for distributing the grain, embraces the pin B. The inner shoulder or portion of this recess is rounded or beveled, so that when the hoe meets with any unusual resistance, it may pass under the pin B, which has on it a friction-roller, B', for the purpose of causing the latch to move more easily, and thus allow the lower end of the hoe to swing backward and pass over the obstruction, and prevent the breaking or derangement of any of the parts. The point at which the latch is pivoted to the drag-bars is near its forward end, its extreme forward end being curved or bent upward to cause it to bear against the plate of metal upon which a spring rests, for a purpose soon to be described.

It will be observed that the arrangement of the latch, with reference to the pin B, the drag-bars D D, and the spring F, is such that when the hoe is in its proper position, the pressure it exerts upon the latch is in a direct line with its pivotal point, as a consequence of which said pressure is exerted upon said pivotal point and not upon the spring, which leaves the spring free to be compressed when the hoe comes in contact with an obstruction to such an extent as to allow the pin B to pass over the rounded shoulder upon the latch E, and thus the lower end of the hoe to recede without meeting with too much resistance from said spring.

The spring above alluded to is shown at F, and is held in position by means of a bracket, G, which is secured to the drag-bars D D, its upper end being bent over so as to form a surface for the upper end of the spring to bear against, and it is perforated to receive the stem of plate H, upon which the spring F rests.

We have shown the spring as made of rubber; but it is apparent that it may be made of steel wound into a spiral form, or any other suitable form of spring may be used, and hence we desire to be understood as not confining ourselves to any particular form of spring; but Having described our invention, what we claim, and desire to secure by Letters Patent, is—

1. The combination, with the hoes or drill-teeth and drag-bars of a grain-drill, of a latch, E, one end of which is detachable from the pin upon which it bears, and a spring, F, at the other end, for holding the hoe or tooth in position, the parts being constructed and arranged substantially as and for the purpose set forth.

2. The combination of the hoe A, having a bifurcated projection, A', the pin B, the latch E, one end of which is detachable, the spring F, and the drag-bars D, the parts being arranged to operate substantially as and for the purpose set forth.

In testimony that we claim the foregoing as our own invention we affix our signatures in presence of two witnesses.

BENJAMIN KUHNS.
CHRISTIAN F. KNEISLY.

Witnesses:
  WM. R. TOMLINSON,
  O. M. GOTTSCHALL.